(No Model.)

J. J. PERINE.
MACHINE FOR SIZING OR FELTING HATS.

No. 292,579. Patented Jan. 29, 1884.

Witnesses
Chas. H. Smith
Harold Serrell

Inventor
John J. Perine
for Lemuel W. Serrell, atty

UNITED STATES PATENT OFFICE.

JOHN J. PERINE, OF PLAINFIELD, NEW JERSEY.

MACHINE FOR SIZING OR FELTING HATS.

SPECIFICATION forming part of Letters Patent No. 292,579, dated January 29, 1884.

Application filed September 17, 1883. (No model.)

*To all whom it may concern:*

Be it known that I, JOHN J. PERINE, of Plainfield, in the county of Union and State of New Jersey, have invented an Improvement in Machines for Sizing or Felting Hats, of which the following is a specification.

Machines have been made consisting of three cylinders so placed as that the roll of hats is worked in a cavity between them. In all such machines the two lower cylinders are in fixed bearings, the upper one being raised to permit the operator to insert or remove the roll of hats. Considerable difficulty has been experienced with these machines because the roll of hats is frequently carried out by the cylinder revolving outwardly before the upper cylinder can be dropped upon it, and sometimes several attempts have to be made before the upper cylinder is dropped quickly enough to keep the hats in their place.

My invention is made for the purpose of effectually preventing the roll of hats escaping when placed between the cylinders, thus saving loss of time and annoyance to the operator.

Figure 1:
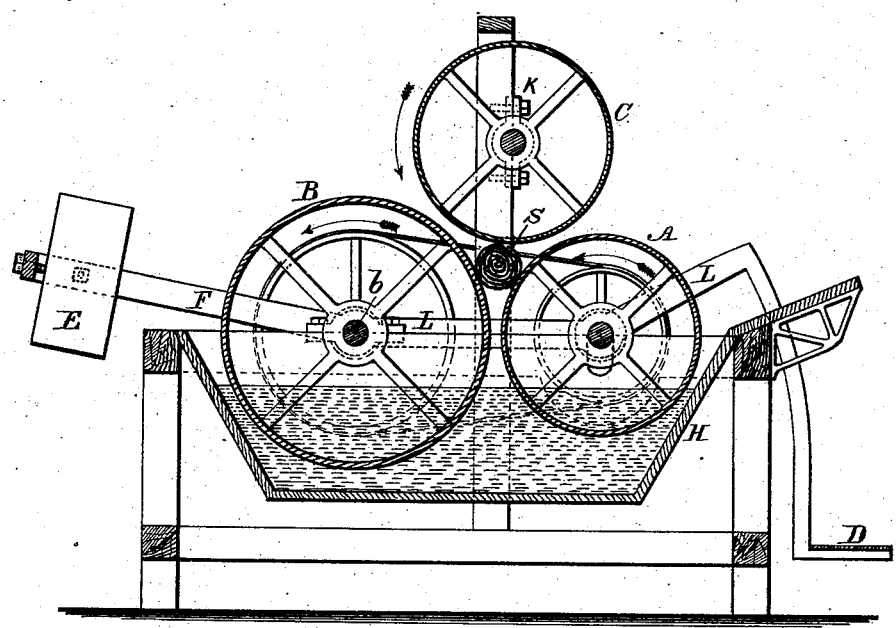
Figure 2:
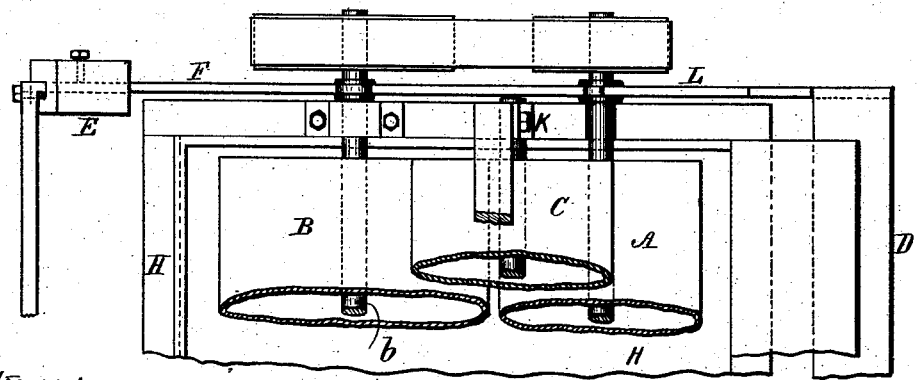

In the drawings, Figure 1 is a section, vertically, of my machine; and Fig. 2 is a partial plan view.

The vat H is of suitable size and material. Usually it is of wood. The cylinder B is upon a shaft in bearings at the upper edges of the vat H, and the cylinder C is above and in front of the cylinder B, and its shaft is supported in bearings K, that are above the vat H, and are rigidly attached to such vat or to the framework of the machine. The cylinders B and C do not touch each other; but their surfaces are near each other—say about one inch apart. The cylinder A is movable. It is supported in a frame, L, to which the treadle or footpiece D is connected. The frame L is pivoted, preferably, upon the shaft *b* of the cylinder B, so that the frame swings upon its pivots as the treadle D is depressed to move the cylinder A away from the cylinder C for inserting or removing the roll of hats or hat-bodies. The cylinder A is moved upwardly by any suitable device, such as a weight or a spring. I have shown the adjustable weight E upon the lever-arm F of the frame L, so that by moving this weight the pressure of the cylinder A against the roll of hats S may be varied as required. The cylinders are revolved by suitable power and in the same direction, as indicated by the arrows. It is preferable to employ pulleys on the respective shafts and an endless belt or chain to connect such pulleys.

It will now be understood that when the operator depresses the foot-piece D the cylinder A will be carried down sufficiently to give access for removing or inserting the roll S of hats, and the said roll will be carried by the cylinders A B back and up toward the cylinder C; but such roll of hats cannot escape between B and C, because they are close together and in fixed bearings. This remedies the difficulty heretofore experienced in many hat-felting machines.

It is preferable to have the frame L, pulleys, and belts outside the vat, and hence it will usually be necessary to slot the sides of the vat where the shaft of the roller A passes to the bearings on the frame L.

It is preferable to make the cylinder B of greater diameter than the cylinder A, because the cylinder A in its revolution carries the roll of hats toward this cylinder B, and when the cylinders A and B are the same diameter the tendency of the cylinder B to carry the roll of hats up and over itself is greater than it is when the cylinder B is the largest, for it will be apparent that with a large cylinder the roll of hats rests against a portion of the cylinder B, a tangent to the surface of which is more nearly vertical than will be a tangent to the point of contact of the roll of hats with a cylinder of the same size as the cylinder A; hence the tendency of the roll to mount the cylinder B will be less when the cylinder B is larger than the cylinder A.

I am aware that hat-felting machines have been made with the lower front roller to rise and fall for admitting or removing the roll of hats. These, however, are entirely above the water-box, and the devices for holding and moving this roller are different from mine, and liable to considerable friction and wear.

I claim as my invention—

1. The combination, with the hot-water vat in a hat-felting or sizing machine, of two cylinders, B and C, in fixed bearings, and a cylinder, A, in the water-vat, below the cylinder C and in front of the cylinder B, and a pivoted frame and bearings for such cylinder A, whereby access is given for inserting or removing the roll of hats by depressing the pivoted frame, substantially as set forth.

2. The combination of the cylinders B C and the fixed bearings for the shafts of the same with the vat H, the cylinder A, the pivoted frame L, and bearings for the axis of the cylinder A, the foot-piece D, and the counterpoise for raising the cylinder A, substantially as set forth.

3. The cylinders A and B, means for rotating the same in one direction, and the frames L, pivoted upon the shaft of the cylinder B, and provided with bearings for the shaft of the cylinder A, in combination with the cylinder C, in stationary bearings above the cylinders A and B, the treadle D, and counterpoise F, substantially as set forth.

4. The combination, in a hat-sizing machine, of a water-vat, a rear cylinder in that vat in fixed bearings, a front cylinder also in the vat, and movable bearings for the same, and a cylinder in fixed bearings above the lower cylinders, the lower rear cylinder being larger than the front cylinder, for the purposes and substantially as specified.

Signed by me this 12th day of September, A. D. 1883.

JNO. J. PERINE.

Witnesses:
AUGUSTUS H. MARTIN,
PETER V. WEAVER.